March 18, 1947.  E. B. McCARTY  2,417,700

UNLOADING AND LOADING APPARATUS

Filed Jan. 20, 1945  4 Sheets-Sheet 1

Inventor

*Everett B. McCarty,*

By *Clarence A. O'Brien
and Harvey B. Jacobson*
Attorneys

March 18, 1947.  E. B. McCARTY  2,417,700

UNLOADING AND LOADING APPARATUS

Filed Jan. 20, 1945  4 Sheets-Sheet 2

Inventor

*Everett B. McCarty,*

By *Clarence A. O'Brien
and Harvey B. Jacobson*
Attorneys

Inventor
Everett B. McCarty,

By *Clarence A. O'Brien*
*and Harvey B. Jacobson*
Attorneys

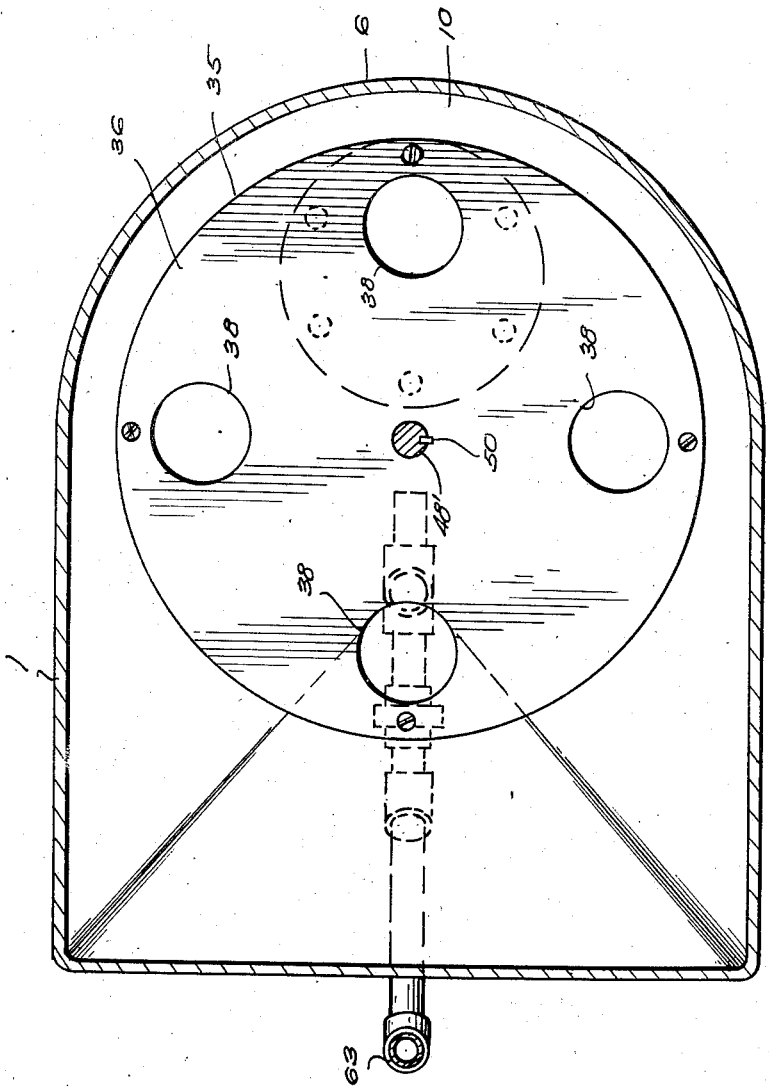

Patented Mar. 18, 1947

2,417,700

UNITED STATES PATENT OFFICE 2,417,700

UNLOADING AND LOADING APPARATUS

Everett B. McCarty, Alton, Ill.

Application January 20, 1945, Serial No. 573,658

2 Claims. (Cl. 302—23)

My invention relates to improvements in unloading and loading apparatus of the suction and pressure-operated type.

The invention is designed with the primary objects in view of providing a practical, efficient apparatus of a dual-purpose type adapted for unloading, by suction, grain, stoker coal, small stone, and like material, from trucks, freight cars, and wagons, or similar depositories, and for loading the same by air pressure into bins and the like, at a remote location from that of the unloading operation, and which is also constructed and arranged for screening grain, and the like, and for use as a suction-operated storage apparatus.

Other objects are to provide apparatus of the character and for the purposes above set forth which involves few parts, is simple in construction, will not readily get out of order, and is economical to operate and manufacture.

Other and subordinate objects, also comprehended by my invention, together with the precise nature of my improvements, and the advantages thereof, will be readily understood when the succeeding description and claims are read with reference to the drawings accompanying and forming part of this specification.

Figure 1:
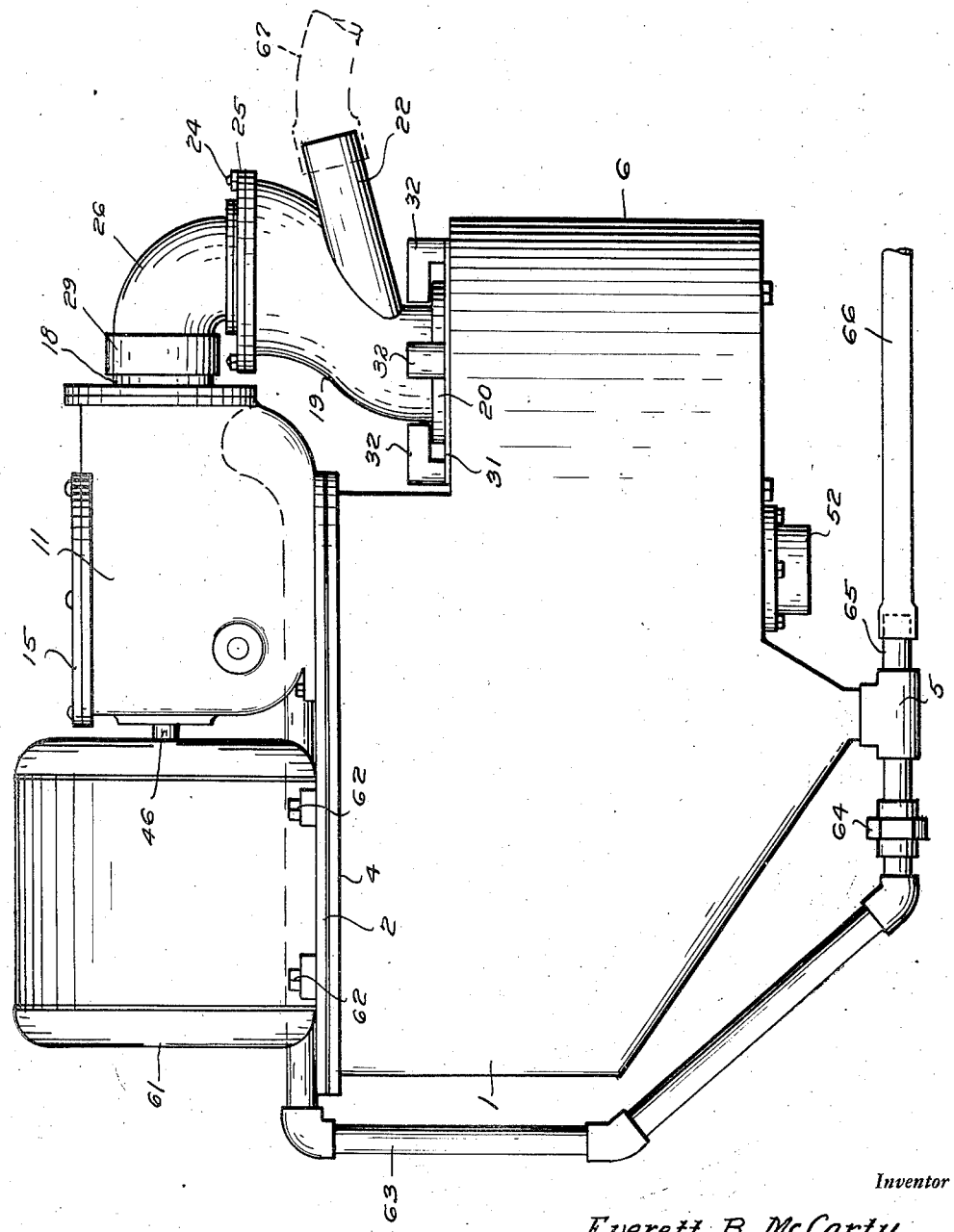
Figure 2:
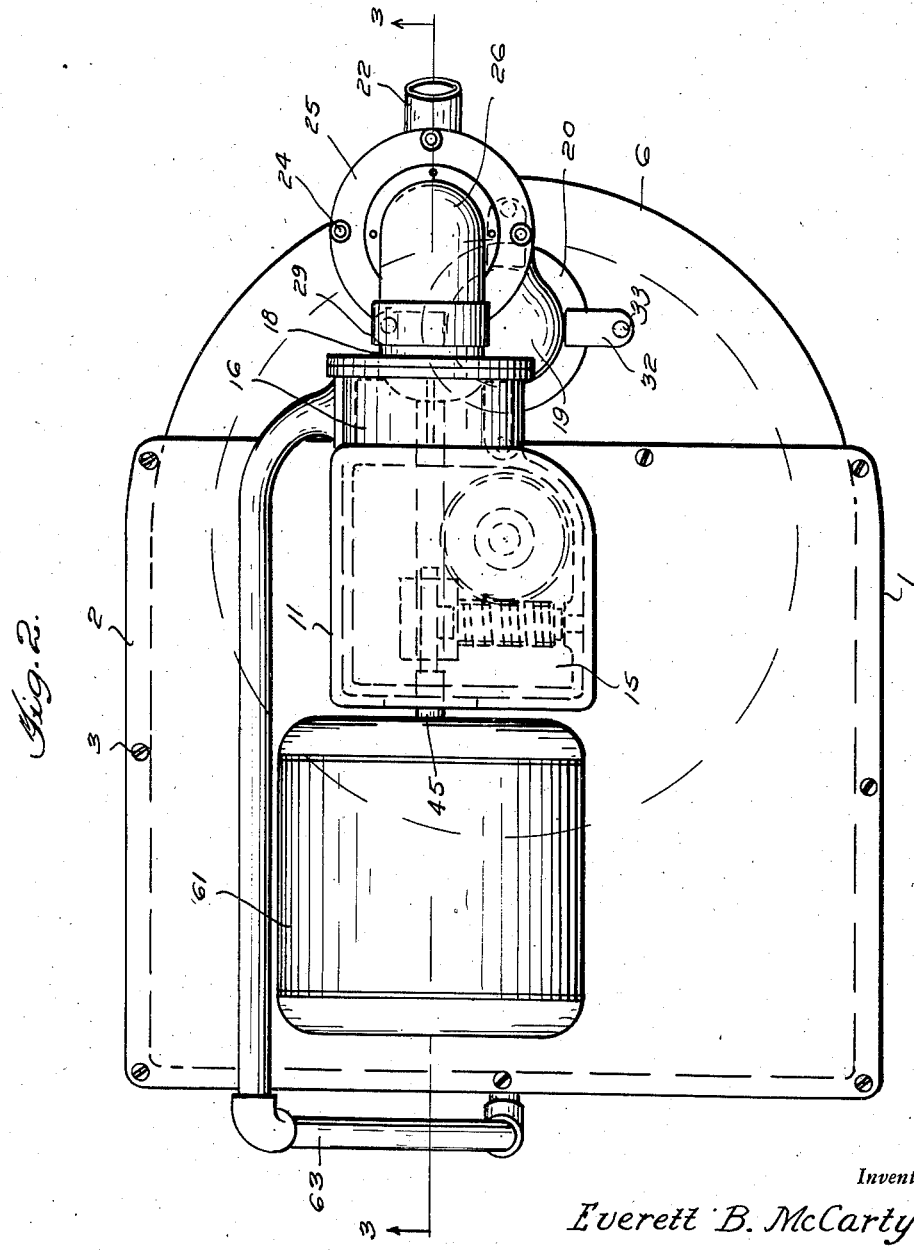
Figure 3:
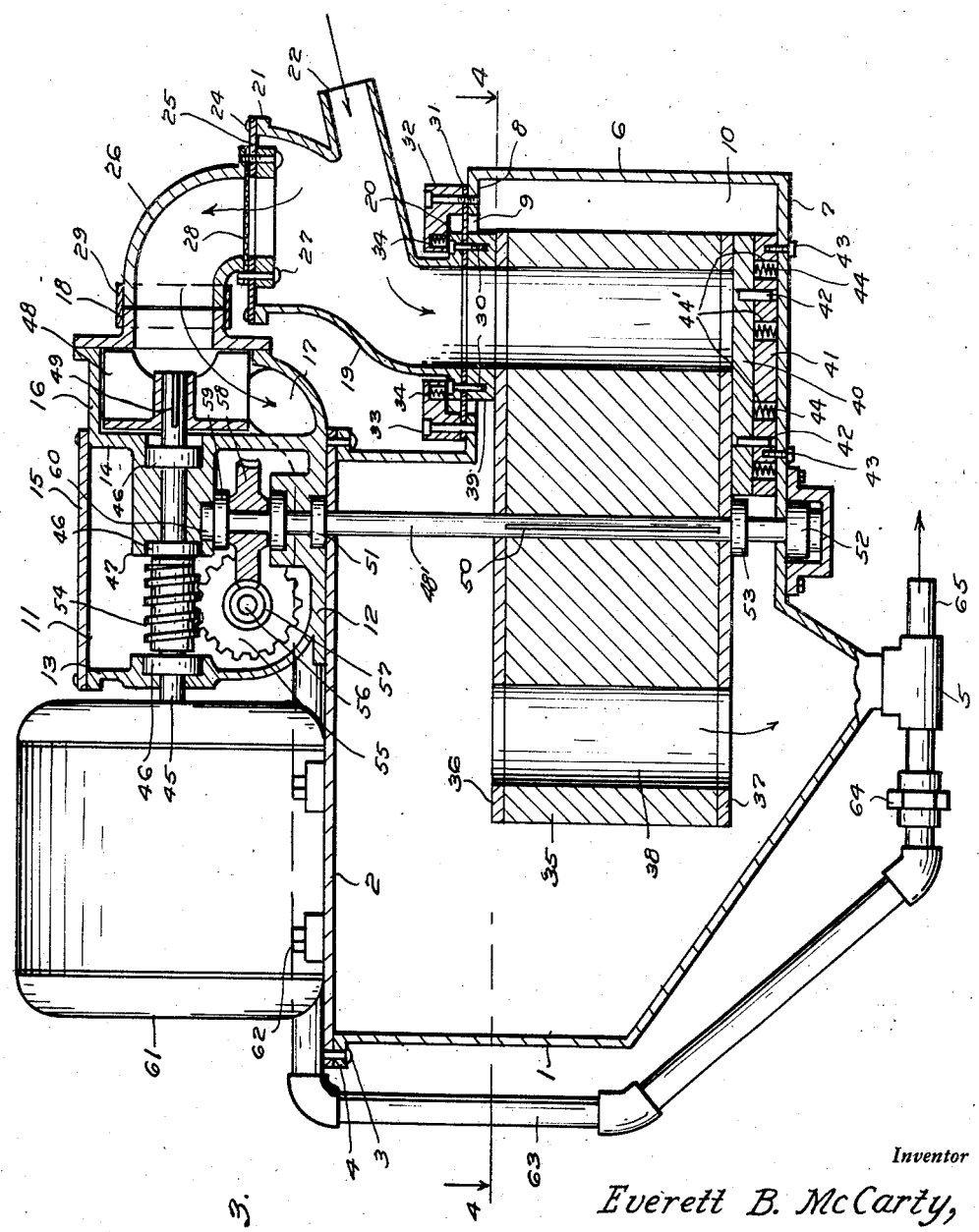

In said drawings:

Figure 1 is a view in side elevation of my improved unloading and loading apparatus in a preferred embodiment, Figure 2 is a view in top plan, Figure 3 is a view in longitudinal section taken on the line 3—3 of Figure 2, Figure 4 is a view in horizontal section taken on the line 4—4 of Figure 3.

Referring to the drawings by numerals, my improved unloading and loading apparatus, as shown, comprises a combined storage and discharge hopper 1 closed at its top by a flat plate 2 bolted, as at 3, to an edge flange 4 on said hopper. The bottom of the hopper 1 terminates in a T-coupling 5. At one side thereof, said hopper 1 is provided with a lateral extension casing 6, of arcuate form in horizontal section, and provided with a flat bottom 7, a flat top 8, at a lower level than the plate 2, and a circular inlet opening 9 in said top 8. The extension casing 6 forms therein a loading chamber 10 opening at one side into the hopper 1 and into which material is introduced through the inlet opening 9. The purpose of the described parts will presently appear.

A gear casing 11 surmounts the hopper 1 at the same side thereof as the casing 6 and which comprises a bottom 12 suitably fixed to the plate 2, end walls 13, 14, and a detachable cover plate 15. The gear casing 11 is provided with an end extension forming a fan housing 16 having a lower outlet, or discharge, port 17 therein and a front inlet nipple 18.

A suction coupling 19, with flanged lower and upper ends 20, 21 and a lateral intake nipple 22, surmounts the casing 6. The upper end 21 of said coupling 19 has fixed thereon, as at 24, an annular sealing diaphragm 25. An elbow fitting 26 of smaller diameter than said upper end 21 of said coupling is fixed at its lower end, concentrically, to said diaphragm 25 by bolts 27 with a disc screen 28 interposed between said end and said diaphragm. The upper end of the elbow 26 is detachably attached, by a keeper ring 29, to the inlet nipple 18 of the fan housing 16. The lower end 20 of the coupling 19 is bolted, concentrically, as at 30, to a relatively larger diameter, annular, rubber diaphragm 31 clamped to the top 8 of the casing 6 over the opening 9 by clamping bars 32 overlying the flange of said lower end 20 and bolted to said top, as at 33. The lower end 20 of the coupling 19 is smaller than the opening 9. As will be seen, the described connections between the coupling 19 and the elbow 26, and between said elbow and the top 8 of the casing 6, permit flexing in the connections so that the coupling 19 may vibrate laterally under the impact of material entering the same, while, at the same time, said connections maintain air-tight seals around the ends of said nozzle. Coil springs 34 countersunk in the clamping bars 32 exert downward pressure on the flanged lower end 20 of said coupling 19 for a purpose presently seen.

A rotary hopper-loading, flat drum 35 is provided in the hopper 1 in horizontal position to extend peripherally, part way, into the loading chamber 10 and be rotated about a vertical axis, and which embodies upper and lower circular wear plates 36, 37, and is provided with vertical pocket-forming through bores 38 therein arranged in a circular series concentrically of said axis to be revolved seriatim into vertical alignment with the lower end 20 of the coupling 19. A sealing ring 39 is interposed between the top of the drum 35 and the lower end 20 of the coupling 19, concentrically thereof, with the diaphragm 31 interposed between said end and said ring, and which is retained in place by the bolts 30 to wipe over the top of said drum 35. As will be seen, the springs 34 by downward pressure on the lower end 20 of the coupling 19, and on the diaphragm 31, act to yieldingly press said ring 39 against the top of said drum 35. A sealing disc 40 is interposed between the bottom of the drum 35 and the bottom 7 of the casing 6 on top of a base disc 41 upon which the disc 40 is mounted for vertical movement by means of studs 42 fixed in the disc 40 and slidably mounted in the disc 41. Bolts 43 secure the disc 41 to the bottom 7 of the casing 6. Coil springs 44 fitted in bores 44' in the disc 41 urge the sealing disc 40 upwardly against the bottom of the drum 35 to thereby form a closing bottom for each bore 38 vertically aligned with the lower end 20 of the suction coupling 19.

A drive shaft 45 extends horizontally through the gear casing 11 with bearings 46 in the end wall 13 and in a boss 47 on the end wall 14. A suction fan 48 is keyed, as at 49, on one end of said shaft 45 for operation in the fan housing 16. A drum-operating shaft 48' extends vertically through the housing 1 with the drum 35 keyed thereon, as at 50, one end of said shaft 48' being provided with bearings 51 in the bottom 12 of the gear casing 11 and extending into said casing. The other end of the shaft 48' is suitably mounted in a bearing 52, on the bottom of the hopper 1, and provided with a collar 53 supporting the drum 35.

A worm gear reduction drive is provided between the drive shaft 45 and the shaft 48' inside the gear casing 11. The said reduction drive comprises a worm 54 fast on the drive shaft 45 and meshing with a worm wheel 55, rotatably mounted on a fixed stud 56 in said casing 11, said worm wheel 55 being provided with a worm 57 smaller than the worm 54 and meshing with a worm wheel 58 fast on the shaft 48' and secured thereon by a collar 59 and a nut 60.

The drive shaft 45 is shown, for the purpose of illustration, as the armature shaft of a motor 61 bolted on the plate 2, as at 62. However, said shaft 45 may be powered by other means than the motor, as will be understood.

A discharge, or blower, line 63 extends from the discharge port 17 of the fan housing 16 to one side of the T-fitting 5 and is detachably secured to said fitting by a coupling 64. The discharge line 63, as will be clear, constitutes an air pressure line to said fitting. A discharge nipple 65 extends from the other end of the T-fitting 5 for coupling to said fitting of a flexible discharge line section, as at 66, for discharging at a location remote from that of the apparatus. The nipple 22 is designed for the attachment thereto of a suction line, as at 67, for drawing into the apparatus material to be unloaded from a remote location.

Referring now to the operation of the described invention. The drive shaft 45 rotates the suction fan 48 which thereby creates a suction in the suction coupling 19 sufficient to draw the material into said coupling by way of the nipple 22. At the same time, the described reduction gearing operates the shaft 48' to rotate the drum 35 and revolve the bores 38 successively into vertical alignment with the lower end of the suction coupling 19. As each bore 38 reaches a position of vertical alignment with the lower end of the suction coupling 19, said bore is closed at its bottom by the disc 40 and said bore formed into a pocket. The material drawn into the suction coupling 19 is prevented from being drawn upwardly out of said coupling by the screen 28 and falls into each bore 38 formed into a pocket in the manner described. As each bore 38 is revolved out of vertical alignment with the lower end of the suction coupling 19 and from over the top of the disc 40, the pocket is opened at its bottom and the contents thereof fall into the bottom of the hopper 1 to gravitate into the fitting 5 from which it is blown by the air pressure in the line 63 and ejected out of the nipple 65, and the line 66.

By substituting a suitably fine mesh screen for the screen 28, the apparatus may be used to screen wheat, and the like, while unloading and loading the same. In this use of the apparatus, the line 63 should be uncoupled from the T-coupling 5 and left open to atmospheric air. When the apparatus is used for screening purposes, the dust and chaff and other foreign matter in the material being screened is drawn out of the suction coupling 19 into the fan housing 16 and discharged out of the discharge line 63. The material in the hopper 1 discharges from the same under gravity feed out of the fitting 5. The described apparatus is also adapted for other uses than those described, as will be clear.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. Unloading and loading apparatus comprising a hopper having a side extension forming a loading chamber provided with a top inlet aperture, a rotatable hopper-loading drum disposed in said hopper to project peripherally into said chamber and having a circular concentric series of vertical bores therein adapted to be revolved successively into vertical alignment with said aperture by rotation of said drum, means in said chamber for closing the bottom of each bore when aligned with said aperture to thereby form a pocket out of the aperture, suction means operative to supply material to be unloaded to said aperture to fall into said pocket and be carried by rotation of the drum into the hopper, and means to discharge material from the bottom of the hopper under air pressure from said suction means.

2. Unloading and loading apparatus comprising a hopper having a side extension forming a loading chamber provided with a top inlet aperture, a rotatable, hopper-loading drum disposed in said hopper to project peripherally into said chamber and having a circular, concentric series of vertical bores therein adapted to be revolved successively into vertical alignment with said aperture by rotation of said drum, means in said chamber for closing the bottom of each bore when aligned with said aperture to thereby form a pocket out of the aperture, and suction means operative to supply materials to be unloaded to said aperture to fall into said pocket and to be carried by rotation of the drum into the hopper.

EVERETT B. McCARTY.

REFERENCES CITED

The following references are of record in the file of this patent:

UNITED STATES PATENTS

| Number | Name | Date |
|---|---|---|
| 512,873 | Finley | Jan. 16, 1894 |
| 138,175 | Merrill | Apr. 22, 1873 |
| 1,184,403 | Woodley | May 23, 1916 |
| 1,771,497 | Mayr | July 29, 1930 |

FOREIGN PATENTS

| Number | Country | Date |
|---|---|---|
| 122,353 | British | Jan. 23, 1919 |